June 19, 1962 R. H. MAINONE 3,039,503
MEANS FOR MOUNTING CUTTER BLADES ON A CYLINDRICAL CUTTERHEAD
Filed Aug. 17, 1960
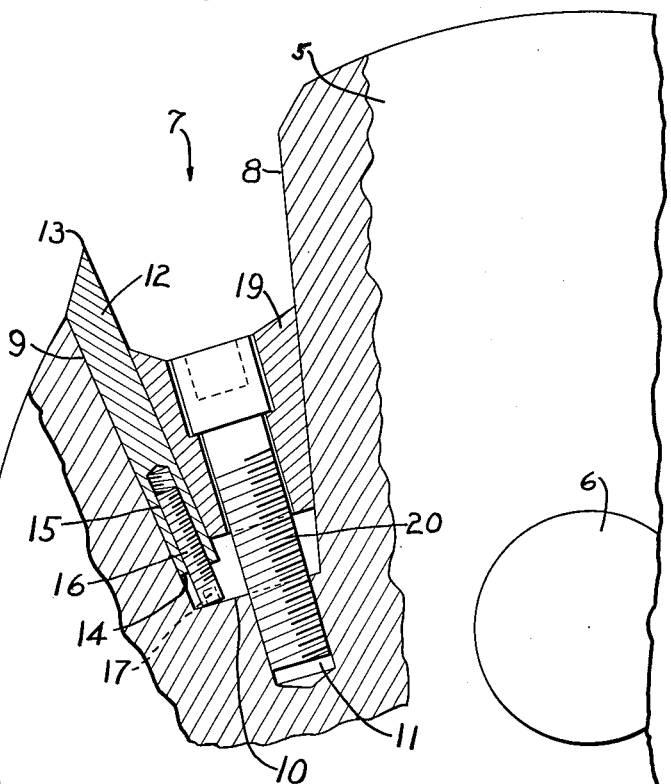
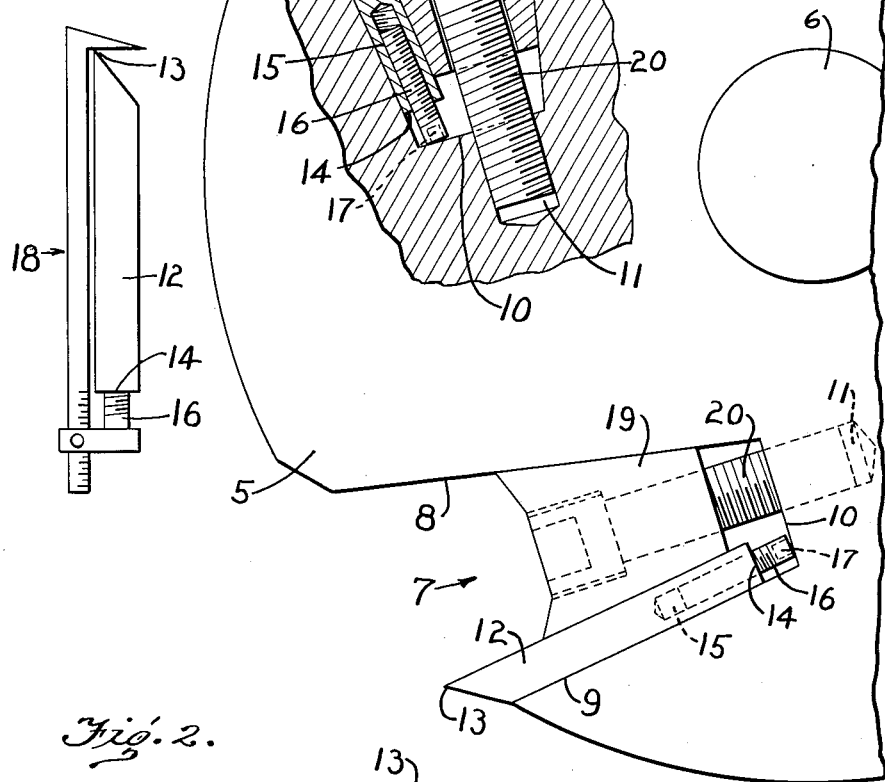
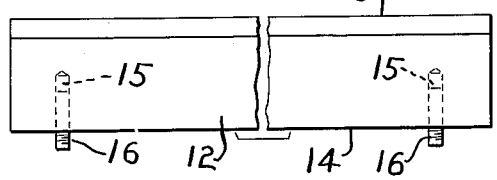
INVENTOR
Robert H. Mainone
BY Roy A. Plant
ATTORNEY

United States Patent Office 3,039,503
Patented June 19, 1962

3,039,503
MEANS FOR MOUNTING CUTTER BLADES ON A CYLINDRICAL CUTTERHEAD
Robert H. Mainone, 80 Maurer Drive, Battle Creek, Mich.; Nell C. Mainone, special administrator of the estate of Robert H. Mainone, deceased
Filed Aug. 17, 1960, Ser. No. 50,100
4 Claims. (Cl. 144—230)

The present invention relates to cutting equipment, and in its specific phases to special adjustable blade constructions in rotary drum cutting machines.

It has become quite customary to employ chipping machines to disintegrate cut-off tree limbs, brush, and the like to reduce the same in volume before hauling away and dumping. Such machines include a rotary power-driven cutting drum having circumferentially spaced pockets, and cutting blades secured in said pockets. The blades must be removed frequently for sharpening, then replaced and re-adjusted. Not only is such procedure arduous and difficult to accurately accomplish but it requires a rather long time, and there is danger of being cut by one blade when adjusting the adjusting means of another blade, due to the location and construction of the adjusting means. The common form of adjusting members for rotary chippers involves push rods forced by screws against the inner end of the cutting blade. These push rods and screws have to go through the drum at such an angle for accessibility that effective endwise adjustment is very limited and tool steel blades have to be discarded when only a small portion of the same has been ground away in sharpening. It was a recognition of these difficulties and the complete lack of any simple and effective solution to the same which led to the conception and development of the present invention.

Accordingly among the objects of the present invention is the overcoming of such difficulties and hazards.

Another object is to provide for rapid and highly accurate adjustment of the cutting blades in a rotary power-driven cutting drum.

In carrying out the above end, another object of the invention is to provide each cutting blade with a plurality of threadedly adjustable set screws extending from the bottom edge of the same in position to abut the bottom of the blade-receiving pocket of a cutting drum, and determine the distance which the cutting edge of the blade projects from the periphery of the drum, the set screws of all of the blades being readily adjustable, before the blades are inserted into the pockets, to locate the inner extremities of the set screws a uniform distance from the cutting edges of the blades. The blades and their set screws may thus be quickly and easily set in proper position and may be removed with equal facility to permit substitution of a sharpened set of blades for a dulled set.

A further object is to provide an improved method of setting the cutter blades as well as permit longer screws to be used as the blades become shorter from sharpening, and thus make possible more completely using up the blades before discarding them.

Still further objects and advantages of the invention will appear as the description proceeds.

To the accomplishment of the foregoing and related ends, the invention, then, consists of the modes and means hereinafter fully described and particularly pointed out in the claims, the annexed drawing and the following description setting forth in detail certain modes and means for carrying out the invention, such disclosed modes and means illustrating, however, but one of the various ways in which the principle of the invention may be used.

In the annexed drawing:

FIGURE 1 is a fragmentary end view, partly in section, showing the improved cutter mounted in place in the rotary drum.

FIGURE 2 is a side view of one of the cutting blades, partly broken away.

FIGURE 3 is a detail view showing a gauge for use in pre-setting the adjustable set screws of the rotary cutter blade so that all blades of a rotary drum will be substantially identically adjusted.

In the drawings, a rotary head or cylindrical drum 5 is fragmentarily shown and which has a shaft 6 to be rotatably mounted and power-driven in conventional manner. This drum 5 has uniform circumferentially spaced peripheral pockets 7 which are symmetrically located relative to shaft 6 and suitably angled with respect to radial lines.

Each pocket 7 has a flat, leading side wall 8, and a flat, trailing side wall 9 disposed in outwardly diverging relation with each other, said trailing side wall 9 sloping moderately in the direction of rotation of said drum to facilitate the cutting action of a cutting blade supported by the same. Each pocket 7 also has a flat bottom 10 extending between the side walls 8 and 9, and the drum 5 has threaded screw-receiving sockets 11 which open through longitudinally spaced portions of said bottom 10. These pockets with their flat bottoms are all symmetrically located relative to the axis of said drum so that identically adjusted blades will fit all of them and have their cutting edges identically spaced radially outward from said axis.

In each of the pockets 7 there is a flat elongated cutting blade 12 which lies against the forwardly tilted trailing side wall 9. The blade 12 has an outer longitudinal cutting edge 13 projecting beyond the periphery of the drum 5, and an inner longitudinal edge 14 perpendicular to the side faces of said blade and spaced from the pocket bottom 10. Each blade 12 also has longitudinally spaced screw-receiving openings 15 which are perpendicular to the inner edge 14 and open therethrough. Headless set screws 16, preferably of the Allen socket type or at least cross slotted, are threaded tightly into the openings 15 and project inwardly into pocket 7, under conditions of use, beyond the inner edge 14 of the blade 12. The inner ends of the set screws 16 abut the pocket bottom 10 to determine the extent which the cutting edge 13 of each of the blades 12 projects beyond the drum 5. Each screw 16 has a non-round socket 17 to receive a suitable wrench for adjusting purposes, and after adjustment each screw may be temporarily secured by applying a paste or fluid cement to the adjacent portions of the screw and blade to hold them against accidental relative shifting.

Adjustment of the set screws 16 is effected before the blades 12 are engaged with the drum 5, and to assure that the extending free ends or extremities of said set screws shall be spaced a predetermined uniform distance from the cutting edges 13, a caliper-like gauge 18, FIGURE 3, may be employed. It is thus assured that when the set of blades is secured to the drum 5, all of the cutting edges 13 will project uniformly from the periphery of said drum or head and extend a substantially equal radial distance from the axis of shaft 6. While one set of blades is being used, another sharpened set, with its set screws 16 pre-set and secured, may be kept in reserve, in readiness for quick and easy substitution for the first set, when dulling of the latter occurs.

An elongated wedge 19 is interposed between each blade 12 and the pocket side wall 8 and contacts with both thereof, and wedge-actuating and holding screws 20 extend through said wedge and are threaded into the sockets 11, respectively. The screws 20, when tightened, move the wedge 19 to operative position to releasably clamp the blade 12 in place and hold it. Upon loosening of the screws 20, however, and consequent loosening of the wedges 19, the blades 12 may be quickly and easily removed, when dulled. A sharpened set of blades, with the set screws 16 pre-set and secured, may then be inserted and clamped in place with equal facility, thus making possible rapid replacement of cutting blades all preadjusted to substantially identical length ready to continue chipping of brush or planing of lumber by means of a jointer.

From the foregoing, it will be seen that novel provision has been disclosed for attaining the desired ends. However, it is to be understood that variations may well be made without departing from the spirit and scope of the invention as shown and described.

Other modes of applying the principle of my invention may be employed instead of the one explained, change being made as regards the method and apparatus herein disclosed, provided the modes and means stated by any of the following claims or the equivalent of such stated modes and means be employed.

I therefore particularly point out and distinctly claim as my invention:

1. In a rotary cutting apparatus, a rotary drum or head having at least one longitudinally extending peripheral pocket, said pocket having a flat leading side wall and a flat trailing side wall in outwardly diverging relation with each other, with both of said walls inclined forwardly in the direction of rotation of said drum while cutting, said pocket also having a longitudinally uniform depth bottom extending between said side walls, a flat elongated relatively thin blade lying against said trailing side wall and having a cutting edge at its forward side with said cutting edge projecting from the periphery of said drum, said flat blade having an inner longitudinal edge spaced from said pocket bottom and being provided with a multiplicity of set screws which threadedly engage the inner edge portion of said blade and project from said inner edge and abut said pocket bottom, said set screws being spaced apart longitudinally of said blade, a blade-clamping wedge interposed between said blade and said leading side wall of said pocket and contacting with both thereof, and at least one wedge-actuating and holding screw extending through said wedge and threaded into said rotary drum through the bottom of said pocket; whereby when said blade becomes dulled, the dulled blade and its set screws may be removed as a unit by loosening said wedge, thereby permitting insertion of a sharpened duplicate blade with pre-adjusted set screws in the same position previously occupied by the removed blade following which said wedge may be tightened to place said drum in condition for use once more.

2. A structure as specified in claim 1, wherein there are several of said pockets placed symmetrically around said drum and extending longitudinally thereof with an adjustable cutting blade in each of said pockets and gripped in place by said blade-clamping wedge and holding screw means, the cutting edges of all of said blades being substantially the same distance from the axis of said drum.

3. A structure as specified in claim 1, in which said set screws are temporarily anchored with adhesive in adjusted position in said blade.

4. An elongated, relatively thin, and flat-sided cutting blade for use in a rotary cutting drum of a chipper or the like, said blade having one elongated edge sharpened for cutting purposes, the opposite edge of said blade having threaded openings in two or more places, and set screws adjustably fitting said openings and extending outward therefrom substantially in the plane of said blade.

References Cited in the file of this patent

UNITED STATES PATENTS

| | | |
|---|---|---|
| 874,871 | Shimer | Dec. 24, 1907 |
| 943,540 | Harrold | Dec. 14, 1909 |
| 1,153,910 | Harrold | Sept. 21, 1915 |
| 1,315,536 | Usher | Sept. 9, 1919 |
| 1,688,913 | Ahrendt | Oct. 23, 1928 |

FOREIGN PATENTS

| | | |
|---|---|---|
| 817,654 | Germany | Oct. 18, 1951 |
| 122,404 | Switzerland | Sept. 16, 1927 |
| 701,004 | Great Britain | Dec. 16, 1953 |